United States Patent
Lortz et al.

(10) Patent No.: US 6,876,889 B1
(45) Date of Patent: *Apr. 5, 2005

(54) RULE PROCESSING SYSTEM WITH EXTERNAL APPLICATION INTEGRATION

(75) Inventors: Victor B. Lortz, Beaverton, OR (US); Jonathan G Ritchie, Tualatin, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 114 days.

(21) Appl. No.: 09/195,362

(22) Filed: Nov. 17, 1998

(51) Int. Cl.[7] .................................. G05B 13/02
(52) U.S. Cl. ............................. 700/30; 700/47
(58) Field of Search ............................. 700/30, 47–49, 700/275, 83, 86, 87

(56) References Cited

U.S. PATENT DOCUMENTS

| | | | | |
|---|---|---|---|---|
| 5,086,385 A | * | 2/1992 | Launey et al. | 700/83 |
| 5,493,642 A | * | 2/1996 | Dunsmuir et al. | 395/349 |
| 5,579,221 A | * | 11/1996 | Mun | 700/83 |
| 5,774,661 A | * | 6/1998 | Chatterjee et al. | 709/203 |
| 5,956,025 A | * | 9/1999 | Goulden et al. | 345/327 |
| 5,988,852 A | * | 11/1999 | Nakanishi | 700/83 |
| 6,038,593 A | * | 3/2000 | Huckins | 709/217 |
| 6,041,306 A | * | 3/2000 | Du et al. | 705/8 |
| 6,061,602 A | * | 5/2000 | Meyer | 700/83 |
| 6,154,680 A | * | 11/2000 | White et al. | 700/19 |
| 6,278,977 B1 | * | 8/2001 | Agrawal et al. | 705/7 |
| 6,332,155 B1 | * | 12/2001 | Notani | 709/205 |
| 6,473,748 B1 | * | 10/2002 | Archer | 706/45 |

* cited by examiner

Primary Examiner—Leo Picard
Assistant Examiner—Zoila Cabrera
(74) Attorney, Agent, or Firm—Kenyon & Kenyon

(57) ABSTRACT

A rule processing system is implemented that allows for the integration of external applications into a common operational framework. External applications are permitted to define nodes in the rule processing system, and users are permitted construct rules in a rule graph using the defined nodes via a browser interface. Rules may be constructed in a hierarchical format, such that the rules are traversed by a rule engine an executed in a structured manner. Integration between external applications and the rule processing system may be via object oriented software techniques, such as the Component Object Model for object interfacing.

40 Claims, 8 Drawing Sheets

RULE PROCESSING SYSTEM WITH EXTERNAL APPLICATION INTEGRATION

BACKGROUND

"Rule engines" are typically self-contained applications that include a number of state variables, a number of actions to perform, and a number of "rules" that are used to determine when to perform a particular action. A typical rule includes a logical equation formed using the variables, such that a specified action is performed when the logic equation evaluates to true. When this occurs, the rule is said to "fire," and the specified action is performed. The logic equations that are evaluated for a rule are sometimes called "predicates"; a rule will only fire when its predicates evaluate to true. A simple example of a rule for turning on a light might be:

IF (TIME>DUSK) THEN (turn_on_light)

According to this example, when a state variable TIME becomes greater than a DUSK value, a "turn_on_light" action is triggered.

Rule engines access a collection of various rules, and typical rule engine implementations employ pattern matching techniques to determine which rules to fire. Ordinarily, the rules are organized in a flat structure; a number of individual rules are defined, each with its own individual predicate. In order to create more complex rule schemes, individual rules may be "linked" together as "chains," thus allowing a series of actions to be performed in succession in response to an event. Linkage between individual rules is typically achieved by state variables: when an event causes a first rule to fire, a state variable is set that will result in the firing of a second rule, and so forth until all the desired actions have been completed.

FIG. 1 illustrates an example of a collection of individual rules to be executed by a prior art rule engine 100 in response to an Event 101. When Event 101 occurs, the rule engine 100 applies its pattern matching techniques and fires Rule 102, which has Event 101 as its predicate. Action 110 is performed, and a state variable 122 is set. When action 110 has been completed, control is passed back to the rule engine 100, which then applies its pattern matching techniques again to determine whether any further rules should be fired. Since Rule 104 includes a predicate containing the state variable 122, the rule engine 100 fires Rule 104. Action 112 is performed, and control is passed back to rule engine 100. This approach requires the use of variables to create complex rule functionality, and to specify a firing order for rule actions.

Rule engines have been found to be useful in conjunction with home automation systems, where rules are composed to perform various activities directed to household operations (e.g., turning on a light, unlocking a door, etc.). Currently, several companies in the home automation field are providing home automation systems with built-in rule engines, including X-10's "ActiveHome," IBM's "Home Director," Home Automated Living's "HAL2000," and products by Savoy Automation and Integrated Media Systems, to name a few. A problem with such embedded rule engines (in addition to the problems described previously), is that they are less open in their architecture, as they are typically tightly coupled to the particular vendor's application and system design. For example, at a lower level, the state variables and particular actions to perform will vary from application to application, and at a higher level, the rule syntax, transmission protocols, and rule evaluation process can vary from vendor to vendor. This tight coupling between rule engines and the applications in which they are embedded (and the proprietary nature of each implementation) tends to motivate vendors to ignore each other's rule engine implementations and create their own. Thus each rule engine has different user interfacing requirements and different rule processing functionality.

Another problem with the use of tightly coupled rule engines with home automation applications is that they are limited in the addition of new features, enhancements or equipment. If the user desires additional functionality not supported, he must either wait for the vendor to implement such functionality in its proprietary rule engine (via an add-on or upgrade), or use a separate application having its own rule engine and associated browser/editor. This unnecessarily increases complexity and difficulty of use for the user, as the user must keep track of the policies and rules indigenous to each application, keep track of the various rules implemented across each application, and deal with each application's user interface (browser). It also prevents the user from constructing rules that combine the functionality of each separate application.

A further problem of tightly coupled rule engines is the possibility for system crashes or hangs due to software or hardware malfunctions. For example, if the software that implements a rule encounters an error condition, the rule action processing can hang the rule engine, and prevent further processing of other rules by the rule engine. While these problems can be minimized by building protections into the application, these protections add further complexity to the application.

SUMMARY OF THE INVENTION

A rule processing system may be implemented as an exemplary embodiment of the present invention. The exemplary rule processing system comprises a rule engine and a rule graph that is operatively coupled to the rule engine and contains at least one rule. The rule processing system also comprises a browser that is operatively coupled to the rule graph in order to allow access to the at least one rule. The rule processing system further comprises a number of application interfaces in order to operatively couple a number of external applications to the rule engine and the rule graph.

DETAILED DESCRIPTION

An exemplary embodiment of the present invention will now be described with reference to FIGS. 2–8, which are provided to illustrate an exemplary rule processing system according to the present invention. The exemplary rule processing system is implemented specifically for use as a home automation control system, although other embodiments according to the present invention for other uses may also be possible. According to the implementation of the exemplary rule processing system, users may create any number of rules for controlling the behavior of household devices. To this end, multiple external applications are able to be integrated into the rule processing system, regardless of the specific internal operation of each application. Users are able to create rules that combine the functionality of each application, thus allowing third party application developers to add individual features to the overall system, while allowing users access to the features of all applications through a single interface. This single user interface may take the form of a browser, which permits the user to access and edit the specifics of each application, as well as create a hierarchical rule graph structure to clearly and specifically define relationships between each action. As each application available through the rule processing system is external to the system, faults encountered by these applications are decoupled from the rule processing system, reducing the risk of rule engine crashes. The result of the exemplary rule processing system is a control system that has a high degree of flexibility, convenience and fault protection.

Figure 1:
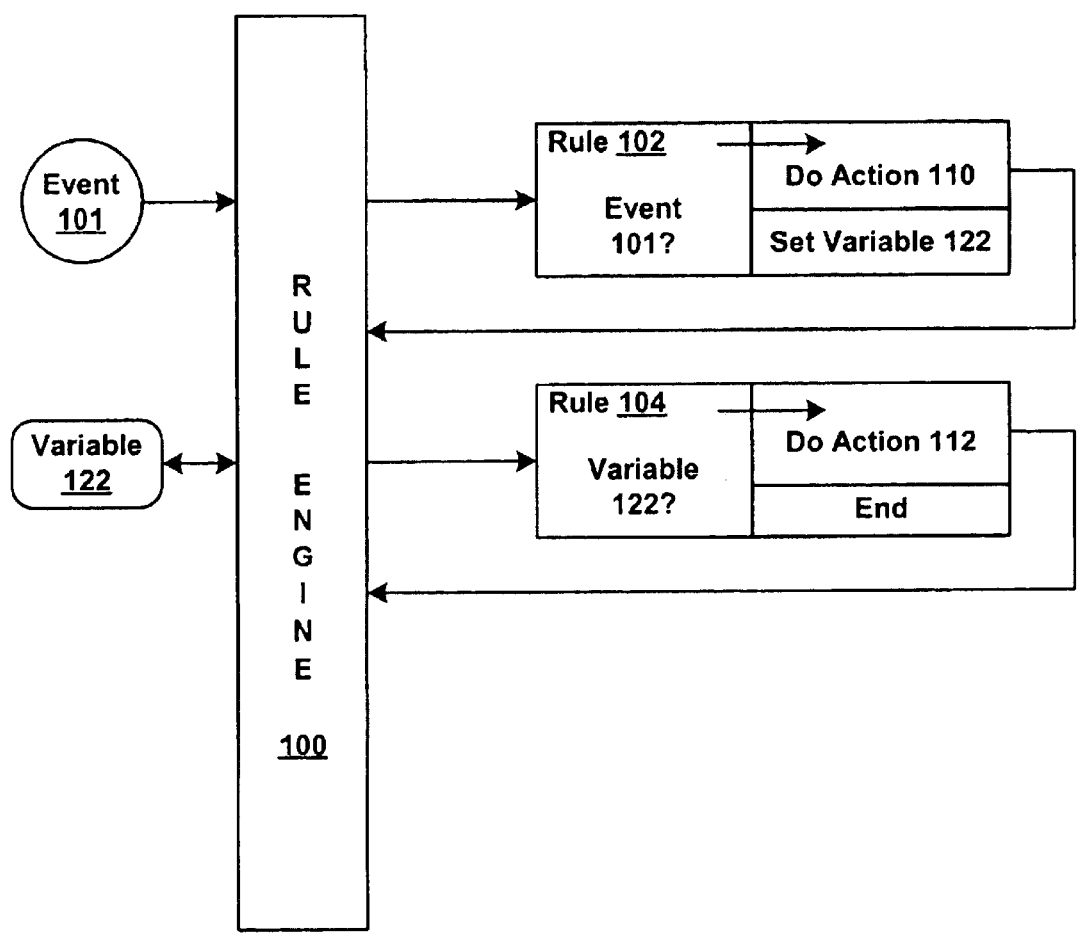
FIG. 1 shows a block diagram of prior art rule processing.
Figure 2:
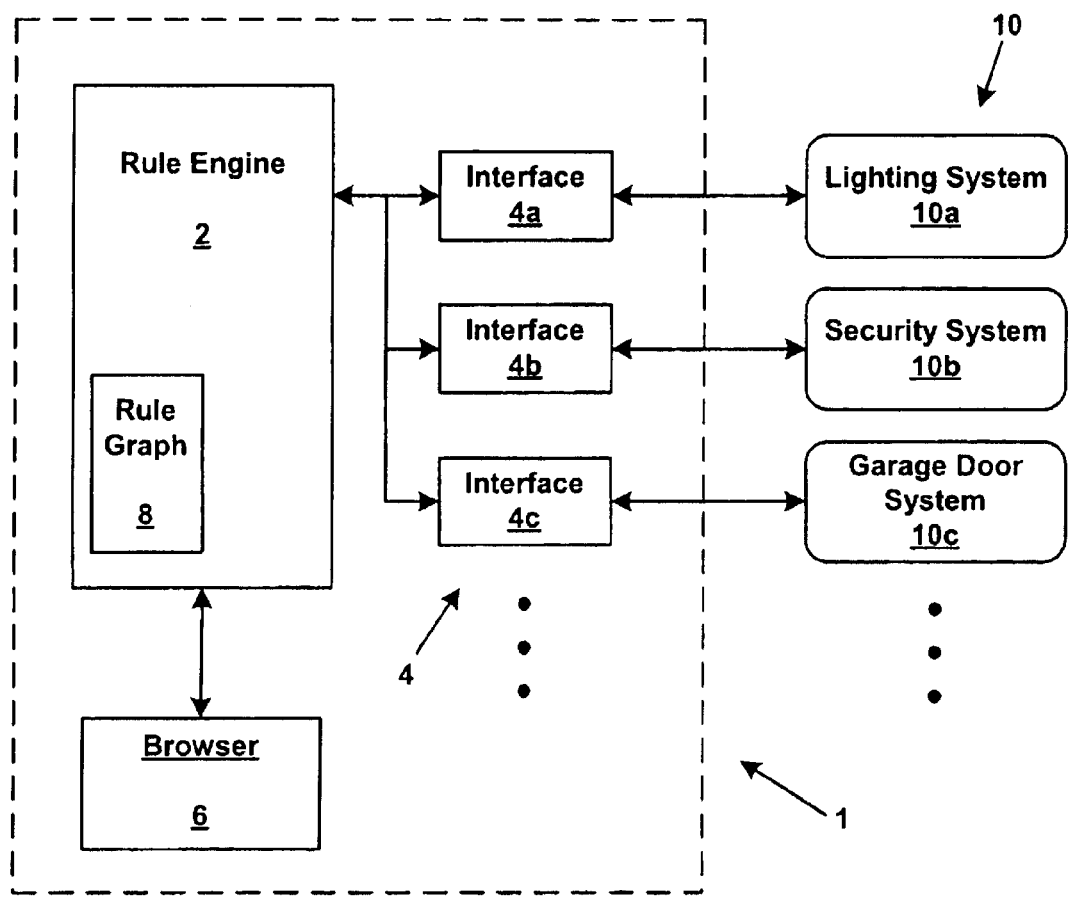
FIG. 2 shows a block diagram of an exemplary rule processing system, according to an embodiment of the present invention.

FIG. 2 depicts a block diagram of an exemplary rule processing system 1 according to the present invention, comprising a rule engine 2, a number of application interfaces 4, a browser 6 and a rule graph 8. Rule graph 8 may be located within rule engine 2, as rule graph 8 contains the various rules capable of being executed by rule engine 2. Accordingly, browser 6 is operatively coupled to rule graph 8 to allow a user to manipulate rule graph 8. Applications interfaces 4 represent the electrical and/or software connections used to allow communication between external applications 10 and rule engine 2. There may be one or more such application interfaces 4 residing in the rule processing system 1, and as illustrated in FIG. 2 there are three such application interfaces 4a–4c in the exemplary embodiment. Each application interface 4 is operatively coupled to rule engine 2 to convey information to/from rule engine 2, and may also be operatively coupled to an external application 10 in order to convey information to/from the application 10. For example, as shown in FIG. 1, the application interfaces 4a–4c are each operatively coupled to a lighting system application 10a, a security system application 10b, and a garage door system application 10c, respectively.

In operation, the rule processing system 1 allows external applications 10 to define "nodes" within the rule processing system 1, and, specifically, to add these nodes to the rule graph 8. These nodes are used to represent events, actions, or decisions (filters) that may be used in constructing rules. A user may then use browser 6 to construct rules by coupling the nodes together in a manner that results in the performance of desired home automation functions. The user may also access and edit internal parameters of the external applications via the nodes defined in rule graph 8 using the browser 6.

When an event is detected by an application 10, an event notification is sent to the rule engine 2 indicating that the event has occurred. The rule engine 2 examines the rule graph 8 to determine if any rules have been triggered by the occurrence of the event. If so, the filters and actions associated with the triggered rules are executed by rule engine 2, for example, by sending appropriate signals via the application interfaces 4 to those applications 10 associated with the desired actions.

The exemplary rule processing system 1 according to the present invention is advantageous in that both the event recognition and action execution functions are delegated to the external applications 10 coupled to the rule engine 2, and therefore the complex and situationally-specific processing associated with these functions remains with the external applications 10. Furthermore, the modular aspect of the processing system provides protection from system crashes, as the applications—which are more likely to be error prone—are operated separately from the rule processing system 1. The exemplary rule processing system 1 also allows users to access internal parameters of the external applications 10 via the browser 6, so that the modular aspects of the rule processing system 1 are practically invisible to the user. Thus, the rule engine 2 provides a flexible complicated control system for integrating multiple functions defined externally.

The exemplary rule processing system 1 is also advantageous in that it allows rules to be defined in a hierarchical manner, rather that a flat or linear manner. Rules can thereby be constructed and displayed according to the dependencies between events and actions in a logical and clear manner, and the user may employ browser 6 to navigate or edit the rule graph 8 to implement desired rules. Rules may be created by coupling nodes defined by any of the external applications 10. Thus, the rule processing system 1 provides a framework for control of all sub-systems within a home automation environment via a single user interface.

Figure 3:
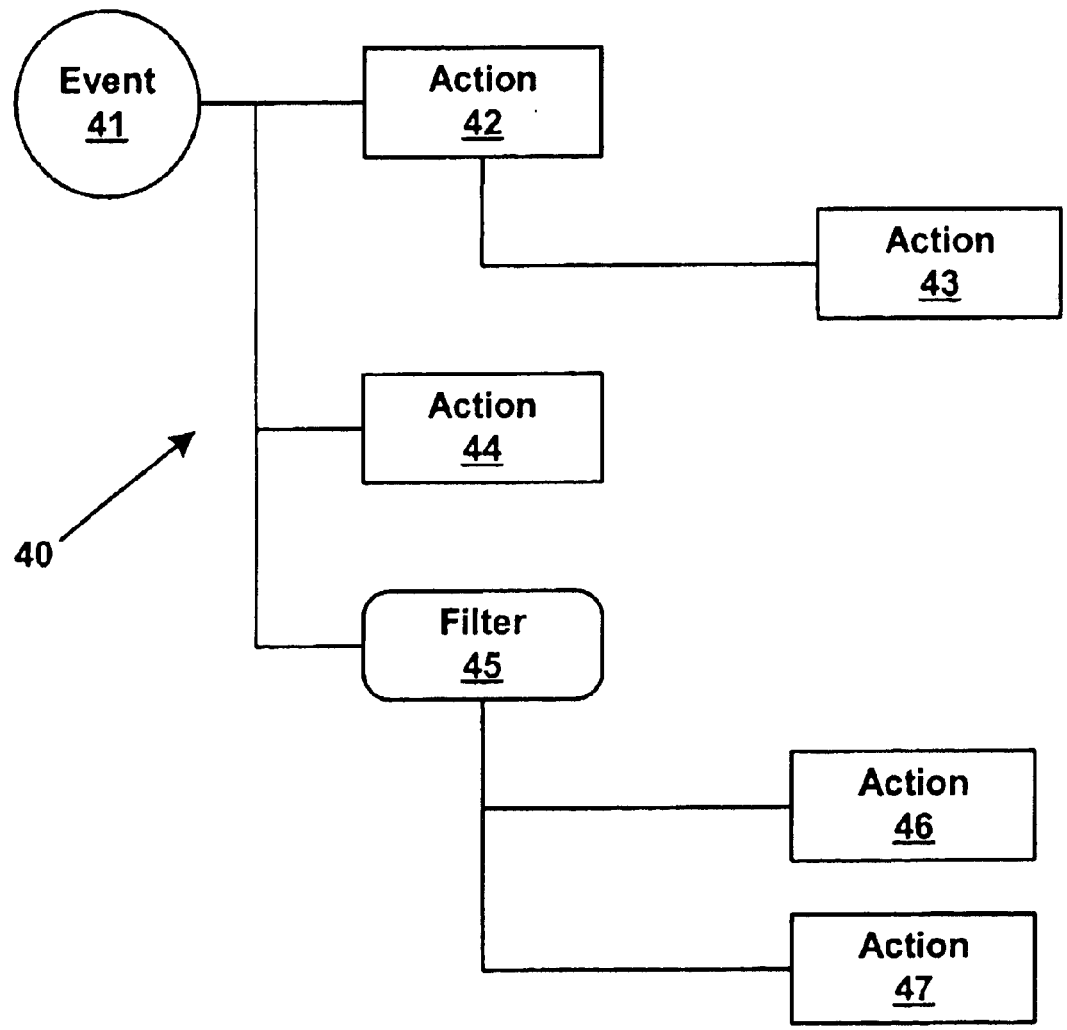
FIG. 3 shows a diagram of an exemplary node hierarchy, according to an embodiment of the present invention.

FIG. 3 illustrates the use of nodes to define rules in exemplary rule graph 8 of the rule processing system 1. Rule graph 8 may take various structural arrangements in order to represent the coupling between nodes. For example, rule graph 8 may take the form of a directed acyclic graph (DAG), which allows for the hierarchical arrangement of nodes to form rules. Another arrangement for rule graph 8 may be a tree structure with different hierarchy levels, similar to the arrangement of files in common computer operating systems (e.g., UNIX, Microsoft's WINDOWS operating systems).

According to the present invention, exemplary rule graph 8 may comprise three different types of nodes: "event" nodes, "action" nodes and "event filter" nodes. Event nodes are used to depict the occurrence of an event (e.g., "the front door has been opened"). Action nodes are used to depict the performance of an action (e.g., "turn on the exterior lights"). Action nodes and event nodes may be created in the rule processing system 1 by an external application 10 when, for example, the application 10 becomes integrated with the rule processing system 1 (as will be further described below), and each such node reflects a function provided by the application 10. Both event nodes and action nodes may incorporate parameters that may be passed between an application 10 and the rule processing system 1 (for example, parameters to set state variables), which may be used by the rule engine 2 during processing as indicated below.

Event filter nodes are used to depict additional decision logic that may be employed to control the performance of actions. Each event filter node includes a logic statement that, when true, causes those nodes coupled to the event filter node to be processed. The logic statement may be based on characteristics of a triggering event, the state of variables that are local to an application 10, or the state of variables that are local to the rule processing system 1. Furthermore, event filter nodes can be defined both by an external application 10, for example, during its integration with the rule processing system 1, and by a user via the browser 6.

Rule processing system 1 includes browser 6, which may be configured to allow the user to construct rules using the nodes defined in rule processing system 1. In the exemplary embodiment according to the present invention, rules may be constructed by coupling nodes together in order to indicate the desired relationships between events and actions. Browser 6 may indicate the coupling of nodes by graphically displaying each node and the connections between each node, thus allowing the user to manipulate each rule using common input devices (e.g., a mouse or keyboard). A "node hierarchy" may be observed by this graphic display. In this regard, the look and feel of browser 6 may be similar to browsers already implemented and well known, for example, in the operating system context (e.g., Microsoft Corporation's WINDOWS EXPLORER for the WINDOWS operating system).

FIG. 3 shows an example of a rule 40 formed using browser 6, according to the exemplary embodiment. Rule 40 may be illustrated as depicted in FIG. 3 (i.e., a tree structure), or in another easy to understand format. Rule 40 (labeled "Example") is triggered by the occurrence of Event 41, as depicted by the event node 41. Event nodes are in the "first level" of the node hierarchy of each rule, as each rule uses an event to trigger its operation. When Event 41 is recognized by the rule processing system 1, processing will proceed to those nodes "dependently coupled" to event node 41, i.e., nodes that will be processed only when Event 41 occurs. Action nodes or event filter nodes may be dependently coupled to event nodes, but event nodes may not be dependently coupled to each other. Nodes dependently coupled to event node 41 may be said to be in the "second level" of the node hierarchy for rule 40. In the example of rule 40, three nodes are dependently coupled to Event 41: action node 42, action node 44 and event filter node 45. Action node 42 is the first node dependently coupled to event node 41, and therefore Action 42 will be performed first.

Once Action 42 has been completed, processing of rule 40 will proceed to any nodes that are dependently coupled to action node 42, i.e., nodes that will be processed only when Action 42 is performed. Only action nodes may be dependently coupled to action nodes, and these nodes would comprise the "third level" of the node hierarchy for rule 40. If no such nodes exist, then processing would proceed to the next node in the second level of the node hierarchy. In this case, however, action node 43 is dependently coupled to action node 42, and therefore Action 43 is performed after Action 42 has been completed. Once Action 43 has been completed, any nodes dependently coupled to action node 43, or any other nodes dependently coupled to action node 42 would be processed. Since no such nodes exist for rule 40, processing reverts back to the second level of the node hierarchy, and to the next unprocessed node: action node 44.

Once Action 44 is completed, and since, as shown in FIG. 3, there are no nodes dependently coupled to action node 44, processing passes to event filter node 45. If the logic statement for event filter node 45 evaluates to true, then processing proceeds to any nodes dependently coupled to event filter node 45. In the case of rule 40, processing proceeds first to action node 46, and then to action node 47. Once Action 47 has been completed, processing would revert back to the second level of the node hierarchy, however, since there are no more nodes left to be processed in the second level, processing of the rule 40 is complete.

Note that if the logic statement for filter node 45 evaluates to false, then the processing of rule 40 would be complete, since the nodes dependently coupled to filter node 45 would not be processed, and there are no further nodes in the second level of the rule hierarchy.

Browser 6 may include additional functions to implement the features of the exemplary rule processing system. For example, browser 6 may allow the user to create event filter nodes for use in the rule graph 8 based on available variables. Browser may also allow the user to access and edit the internal parameters of the functionality represented by each node, for example, by selecting the node and performing an edit operation. As will be explained further below, in such a case, the user may be accessing parameters located in an external application 10 that support the functionality represented by the selected node, via the application interface 4 connected to external application 10. This edit operation may be achieved by, for example, invoking an editing function at the external application 10, or using editing capabilities local to the browser 6.

Figure 4:
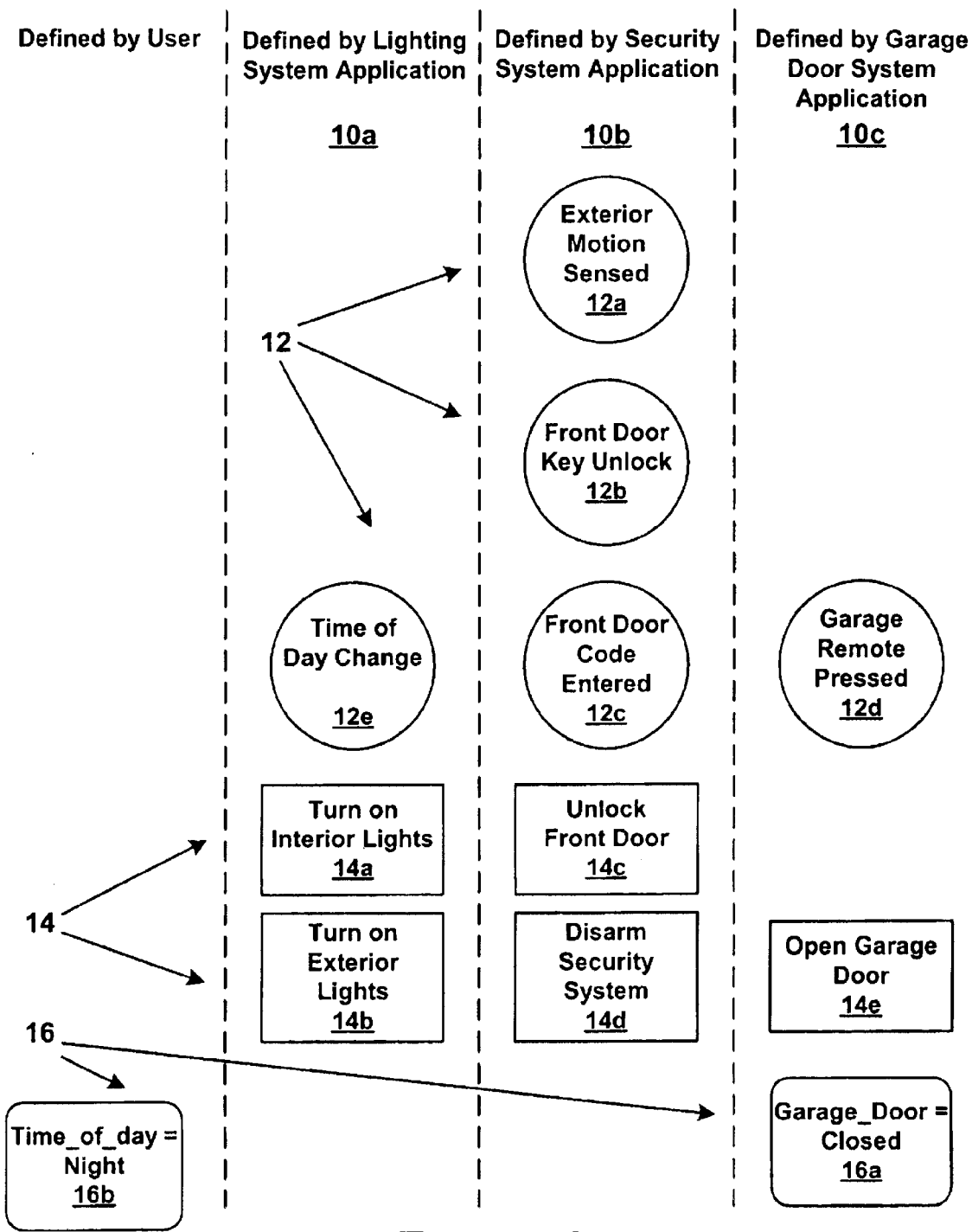
FIG. 4 shows exemplary nodes defined in an exemplary rule graph, according to an embodiment of the present invention.
Figure 5:
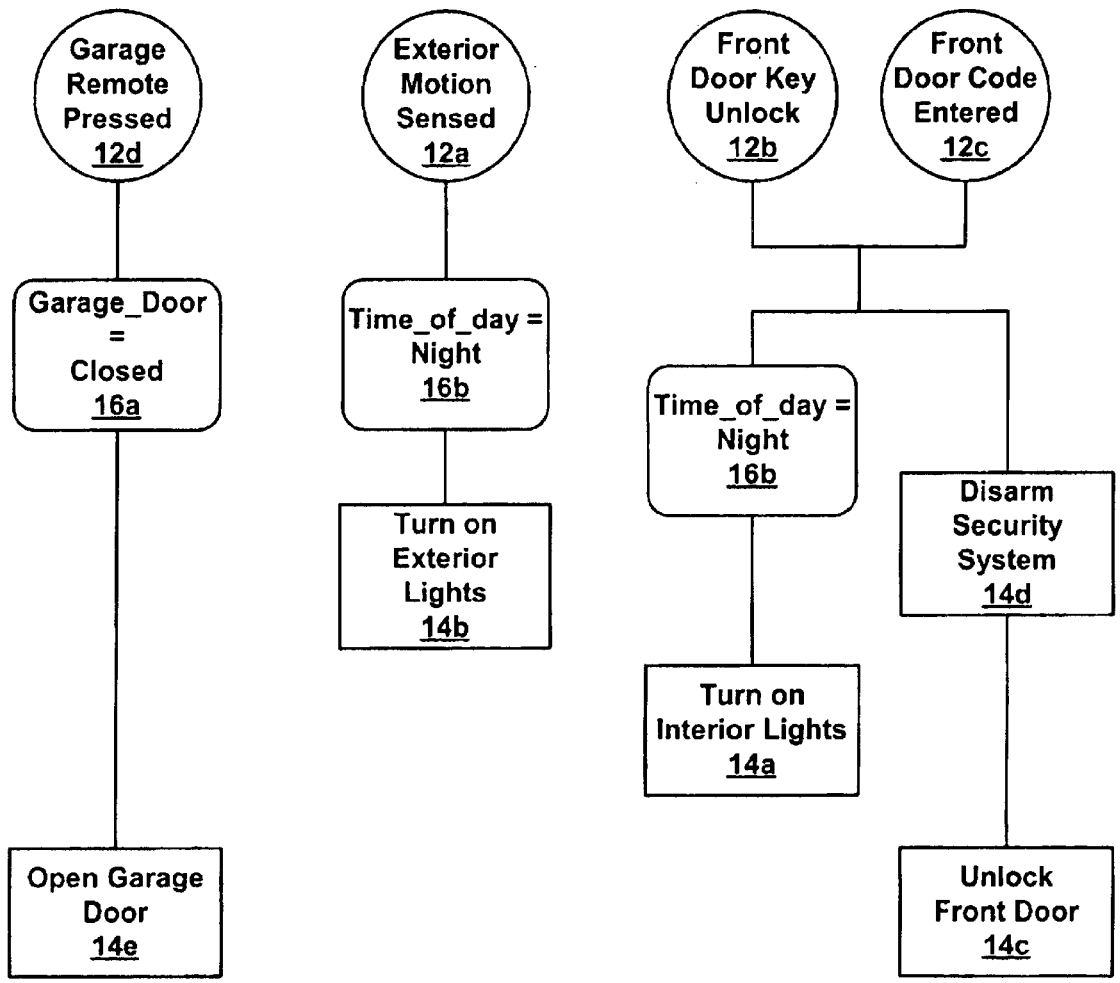
FIG. 5 shows exemplary rules formed using the nodes defined as shown in FIG. 3, according to an embodiment of the present invention.
Figure 6:
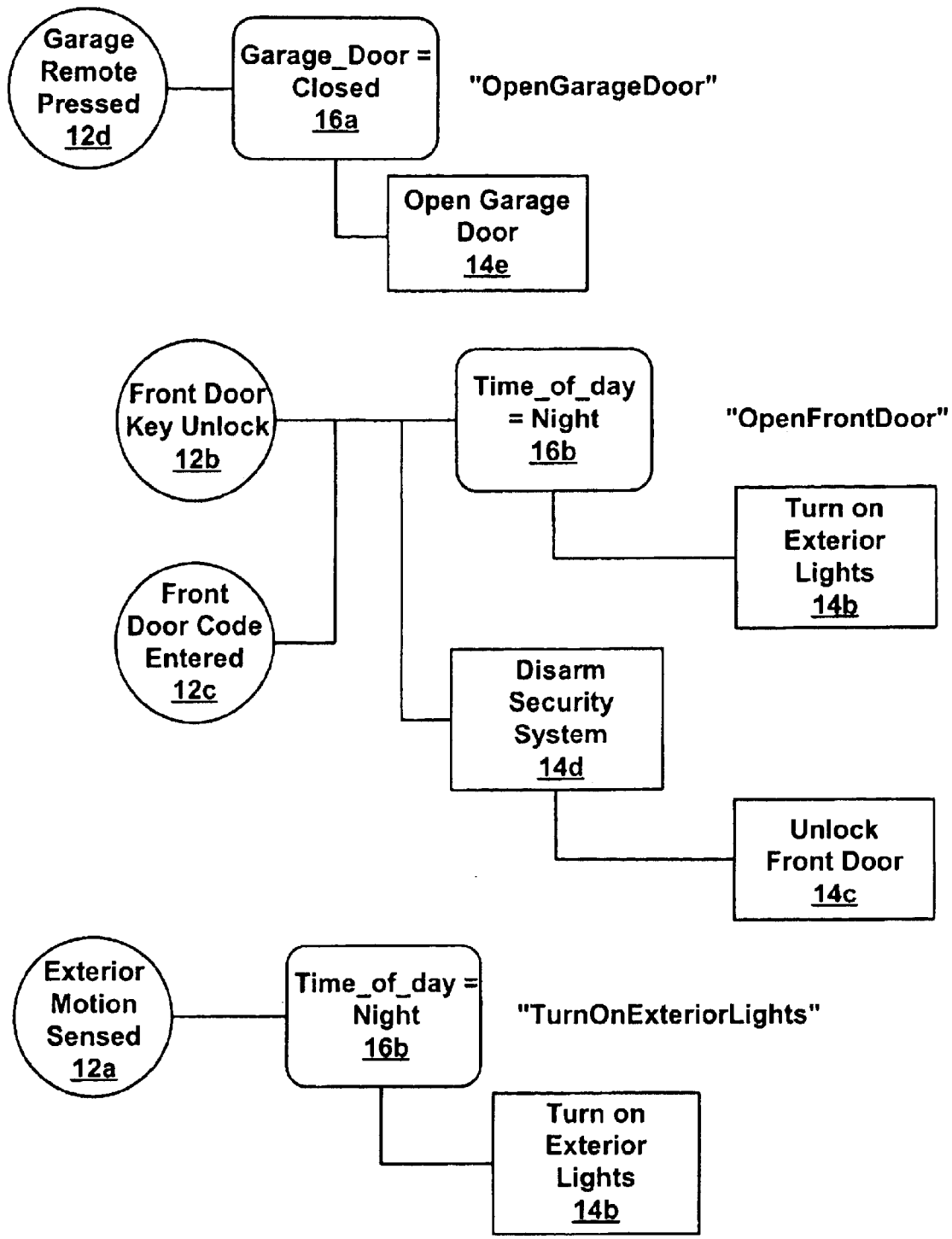
FIG. 6 shows the exemplary rules of FIG. 4, depicted in a tree diagram format, according to an embodiment of the present invention.

FIGS. 4–6 illustrate an example of some possible rules created using the rule processing system 1 according to the present invention. Depicted in FIG. 4 are a number of possible nodes that may be defined in the exemplary rule processing system 1. FIG. 4 shows that five event nodes 12 have been defined, representing the following events: exterior motion sensed (event 12a), front door key unlock (event 12b), front door code entered (event 12c), garage remote pressed (event 12d), and time of day change (event 12e). Events 12a–12c were defined by the security system application 10b, while event 12d was defined by the garage door system application 10c and event 12e was defined by the lighting system application 10a. Each event node 12 represents a particular event notification function that can be performed by the external application that has defined the particular event node 12. For example, the "exterior motion sensed" event node 12a represents an event notification function that may be performed by the security system application 10b.

Each event node 12 may also be associated with a number of "parameters" that may be provided via the event notification function for that event node 12. These parameters may provide, for example, information about the type of event that has been detected by the application 10 that supports the event notification function. The rule processing system 1 may include variables that are set according to the parameters provided by an event notification function. For example, although not depicted in FIG. 4, the event notification function for event 12e provides a parameter that is used to set a variable local to the rule processing system 1 for the state of the time of day: Time_of_Day="DAY" or "NIGHT".

Also shown in FIG. 4 are five action nodes 14: turn on interior lights (action 14a), turn on exterior lights (action 14b), unlock front door (action 14c), disarm security system (action 14d), and open garage door (action 14e). Action nodes 14a–14b were defined by the lighting system application 10a, action nodes 14c–14d were defined by the security system application 10b, and action node 14e was defined by the garage door system application 10c. Each action node 14 represents action functions that can be performed by the external application 10 that defined the action node 14.

FIG. 4 also shows two event filter nodes 16: event filter node 16*a*, which evaluates to true when the "Garage_Door" variable indicates a "closed" condition, and event filter node 16*b*, which evaluates to true when the "Time_of_Day" state variable indicates a "NIGHT" condition. Event filter node 16*a* was defined by the garage door system application 10*a*, and accesses the Garage_Door variable local to the garage door system application 10. Event filter node 16*b* was defined by a user via the browser 6 using the "Time_of_Day" variable local to the rule processing system and updated by the lighting application 10*a*.

Further event nodes 12, action nodes 14 and event filter nodes 16 may be defined in addition to those described above, depending on the functions available at the external applications 10 and the operations described by the user. However, the event nodes 12*a*–12*e*, action nodes 14*a*–14*e* and event filter nodes 16*a*–16*b* depicted in FIG. 4 will serve to illustrate several features of the exemplary rule processing system 1 according to the present invention, in conjunction with the examples given below.

FIGS. 5 and 6 illustrate a number of exemplary rules that have been created in rule graph 8 using the nodes defined as shown in FIG. 4. FIG. 5 gives a first graphical depiction of the exemplary rules defined in rule graph 8, while FIG. 6 gives a second graphical depiction of the exemplary rules, in tree diagram form, to accentuate the node hierarchy of each rule. Other rules may be defined in the rule graph 8, however, the given rule examples will serve to illustrate some of the features of the exemplary rule processing system 1.

The first rule example—OpenGarageDoor—is a simple rule that is intended to open a garage door when a garage door remote control button is pressed and the Garage Door is in the closed position. As shown in FIG. 5, this rule was formed by dependently coupling event filter node 16*a* to event node 12*d*, and dependently coupling action node 14*e* to event filter node 16*a*. Accordingly, when event 12*d* occurs (i.e., the garage remote is pressed) and if the logic statement of event filter node 16*a* is true (i.e., the Garage_Door variable is equal to "closed"), the action node 14*e* is executed (i.e., the garage door is opened).

The second rule example—TurnOnExteriorLight—is a rule that is intended to turn on exterior lights when movement is sensed outside of a house by a motion detector. This rule was formed by dependently coupling event filter node 16*b* to event node 12*a*, and by dependently coupling action node 14*b* to event filter node 16*b*. Accordingly, when event 12*a* occurs (i.e., there is motion sensed) and if the logic statement of event filter node 16*b* is true (i.e., the Time_of Day variable is equal to "NIGHT"), the action node 14*b* is executed (i.e., the exterior lights are turned on).

The third rule example—OpenFrontDoor—is a rule that is intended to turn on interior house lights when it is nighttime, disarm a security system and unlock a front door, all when a front door key is successfully inserted or a key code is successfully entered into a keypad. An additional condition for this rule is that the front door must not open until after the security system has been disarmed. The OpenFrontDoor rule was formed by dependently coupling event filter node 16*b* and action node 14*d* to event nodes 12*b* and 12*c*, by dependently coupling action node 14*a* to event filter node 16*b*, and by dependently coupling action node 14*c* to action node 14*d*. Accordingly, when either events 12*b* or 12*c* occur (a key is inserted or a key code is entered), and if the logic equation of event filter node 16*b* is true (it is nighttime), the action node 14*a* is executed (the interior lights are turned on). Once the event filter node 16*b* is processed, action node 14*d* is executed (the security system is disarmed), and once the security system has been disarmed, action node 14*c* is executed (the front door is unlocked). As illustrated by the OpenFrontDoor rule, the hierarchical nature of rules constructed from nodes allows for the arrangement of a node firing sequence based on the location of the nodes in the rule hierarchy.

As illustrated by the above examples, the formation of rules using rule processing system 1 is simplified from the user's perspective in that nodes from various applications may be combined to achieve desired actions without consideration of the internal operation of each application 10. The use of the rule graph 8 allows for seamless integration between the functionality of the various external applications 10. For instance, the second rule example—TurnOnExteriorLight—uses an event provided by the security system application 10*b* (Event 12*a*—"Exterior Motion Sensed") to trigger the performance of an action provided by the lighting system application 10*a* (Action 14*b*—"Turn on Exterior Lights"). The use of the rule graph 8 also allows the user to create time dependencies through the hierarchical nature of the graph. For example, in the third rule example—OpenFrontDoor—the performance of the unlock front door action 14*c* may only occur after the disarm security system action 14*d* has been successfully completed. If the disarm security system action node 14*d* is not complete (for example, due to an error at the security system application 10*b*), the unlock front door action 14*c* is not executed. This feature also helps to prevent system crashes, as a failure at any single application is isolated to that application, and therefore will not prevent the operation of the other applications in conjunction with the rule processing system 1.

The implementation of the exemplary rule processing system 1 may be achieved through the use of object-oriented software techniques. For example, each function of each external application 10 may be implemented as a software "object" that is provided by the external application 10. In order to allow other programs to access the software object (e.g., to cause the function supported by the object to be performed), the object provides a number of software interfaces that allow the passing of data and control information. The internal operations of each software object, however, are kept unknown to the outside environment. The use of software objects of this type is well known in the art.

The exemplary rule processing system 1 takes advantage of the separation between the internal operation of the object and the interfaces exposed by the object to achieve modularity and flexibility. In the exemplary rule processing system 1, each external application 10 identifies to the rule processing system 1 the software objects provided by the external application 10 by defining a node (as described above) to represent the functionality provided by that object. Each node includes the name of the function (to display to the user) and the various parameters needed to communicate with the software object via the interfaces provided by the object. As a result, when a node is "processed" by the rule processing system 1, the node actually represents a communication with an object located within some external application 10. Thus, the rule processing system 1 may integrate a software object present at an external application 10 into its rule graph 8, without knowing exactly what functions the object is performing.

In the exemplary embodiment according to the present invention, the rule processing system 1 implements the object integration described above by using the Component Object Model (COM), which provides a known framework for communication with object interfaces. Similar frameworks might also be used.

In the exemplary rule processing system 1, COM interfaces are used to establish the communication between objects at external applications 10 and the rule processing system 1. Two examples of such COM interfaces are IMoniker and IPerformAction. IMoniker is a well known COM interface that allows "monikers" to be defined, which can be used to locate and invoke software objects present at an external application 10 or in the rule processing system 1. In the context of the present system, monikers are used to identify and locate individual software objects that have been made available to the rule processing system 1 by the external applications 10. A moniker for a particular software object may be defined, for example, when the object is identified to the rule processing system 1, and may then be stored at the node which is used to represent the functionality of that object. The moniker may also include initialization parameters for the object (e.g., the specific actions that should be performed).

When the rule processing system 1 needs to communicate with an object (for example, when an action node or event filter node is being processed), the IMoniker interface is used to "bind" the moniker to the desired object: a pointer to the desired object is provided to allow the rule processing system 1 to communicate with the object. If the object was not running prior to the bind request, the bind moniker operation will start the object running using any initialization parameters included in the moniker.

IPerformAction is a COM interface that allows the rule processing system 1 to instruct software objects to perform the actions they implement. IPerformAction provides two functions that allow access to the software object: PerformAction and EditAction. The COM format for these functions is given below:

---

HRESULT  PerformAction ( )
HRESULT  EditAction([out] BSTR *NewDisplayName, [out] BSTR *actionName)

---

Once a software object is running and a pointer to the object has been obtained (e.g., using a bind moniker operation described above), the rule processing system may call the PerformAction function (for example, during node processing) to cause the object to perform its actions. Note that the rule processing system 1 does not need to know anything about what actions are being performed, or even which application is performing the action, since the moniker stored at the node provides all the information needed to access the object. The PerformAction function returns a result value indicating whether the object has successfully performed its actions.

The EditAction function allows the user of the rule processing system 1 to access the internal parameters of the object. This function may be invoked during processing of a node in browser 6 to allow the user to access and edit parameters of the various nodes defined in the rule processing system 1. Any changes to the object parameters will cause the generation of a new moniker for the node which includes the changed parameters (as indicated by the *NewDisplayName function parameter) and may also cause the textual description of the affected node to be altered in the browser 6 (as indicated by the *actionName function parameter). When the node is later processed by the rule engine 2, the new moniker will be bound, starting a new object running initialized with the new parameters and generating a pointer to that object for use in the PerformAction call.

The exemplary rule processing system 1 may employ additional COM interfaces to implement further functionality as needed. For example, additional interfaces may be provided as needed to handle event notification functions for event nodes or event filter nodes. The IMoniker interface may be used to obtain pointers to objects that employ these additional interfaces in a manner similar to that described above.

Figure 7:
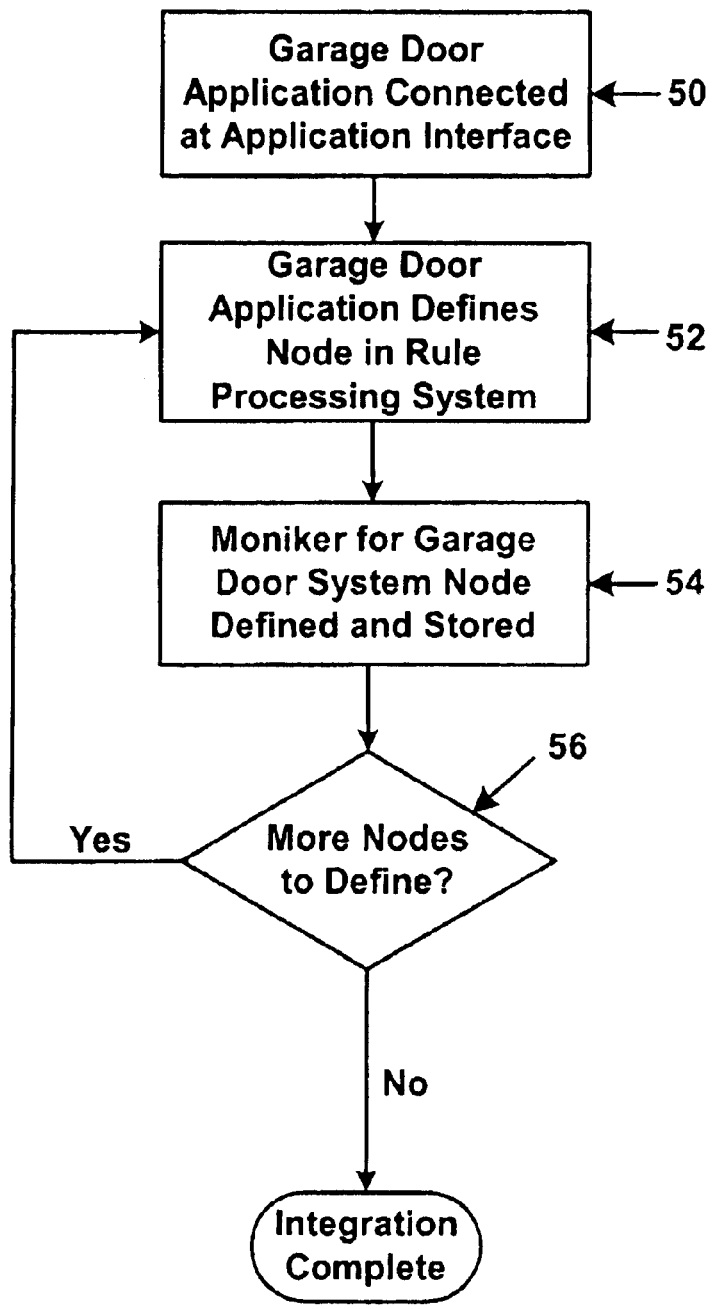
FIG. 7 shows a flow chart of an exemplary integration of an external application into the exemplary rule processing system, according to an embodiment of the present invention.

Integration of an external application 10 into the exemplary rule processing system 1 involves the definition of nodes within the rule processing system 1 and the definition of associated monikers to represent the functionality of the external application 10. As an example, FIG. 7 shows a flow chart of the integration of the garage door system application 10c into the rule processing system 1. In step 50, the rule processing system 1 recognizes the connection of the garage door system application 10c to the application interface 4c. This connection may be the physical connection of the garage door system 10c to the rule processing system 1, or the presence of interfacing software (e.g., drivers) to which the rule processing system 1 has access (e.g., on a disk or network).

In step 52, the garage door system application 10c defines in rule processing system 1 a node representing a function provided by the garage door application 10c to the user. Definition may be achieved, for example, by transmitting a label for the node name via the application interface 4c, such that a node with the designated label is included in the rule processing system 1. In the present example, the node named "Open Garage Door" (action node 14e) is defined in the rule processing system 1. In step 54, a moniker is defined for the "Open Garage Door" action. This definition may be achieved, for example, by using the functions provided by the IMoniker interface. The moniker is stored with the node, such that it may be used later to invoke the software object that performs the "Open Garage Door" action.

If further nodes need to be defined (step 56), steps 52 and 54 are repeated until all nodes representing the functionality of the garage door system application 10c have been defined in the rule processing system 1. In the present example, the "Garage Remote Pressed" event node 12d and the event filter node 16a are defined in addition to the "Open Garage Door" action node 12.

Event filter nodes 16 present an additional complexity in that decisional logic may be included in the moniker used by the node. The default event filter node may include no logic equation, and is simply an adapter that translates the occurrence of an event into the activation of a rule. However, more complex logic statements for event filter nodes may evaluate multiple events or variables to determine whether or not to trigger the nodes which are dependently coupled to the event filter node 16. The logic to be evaluated can be indicated at the event filter node 16 via a moniker having the proper parameters, or simply a logic statement that may be evaluated by the rule engine 2. For example, the "Garage_Door Closed" event filter 16a uses a moniker that includes a parameter for the invoked object indicating the desired state of the garage door variable: Garage_Door="closed" or "open." When the event filter node 16a is processed and the moniker is bound to a software object, the object is initialized to evaluate the state variable.

Figure 8:
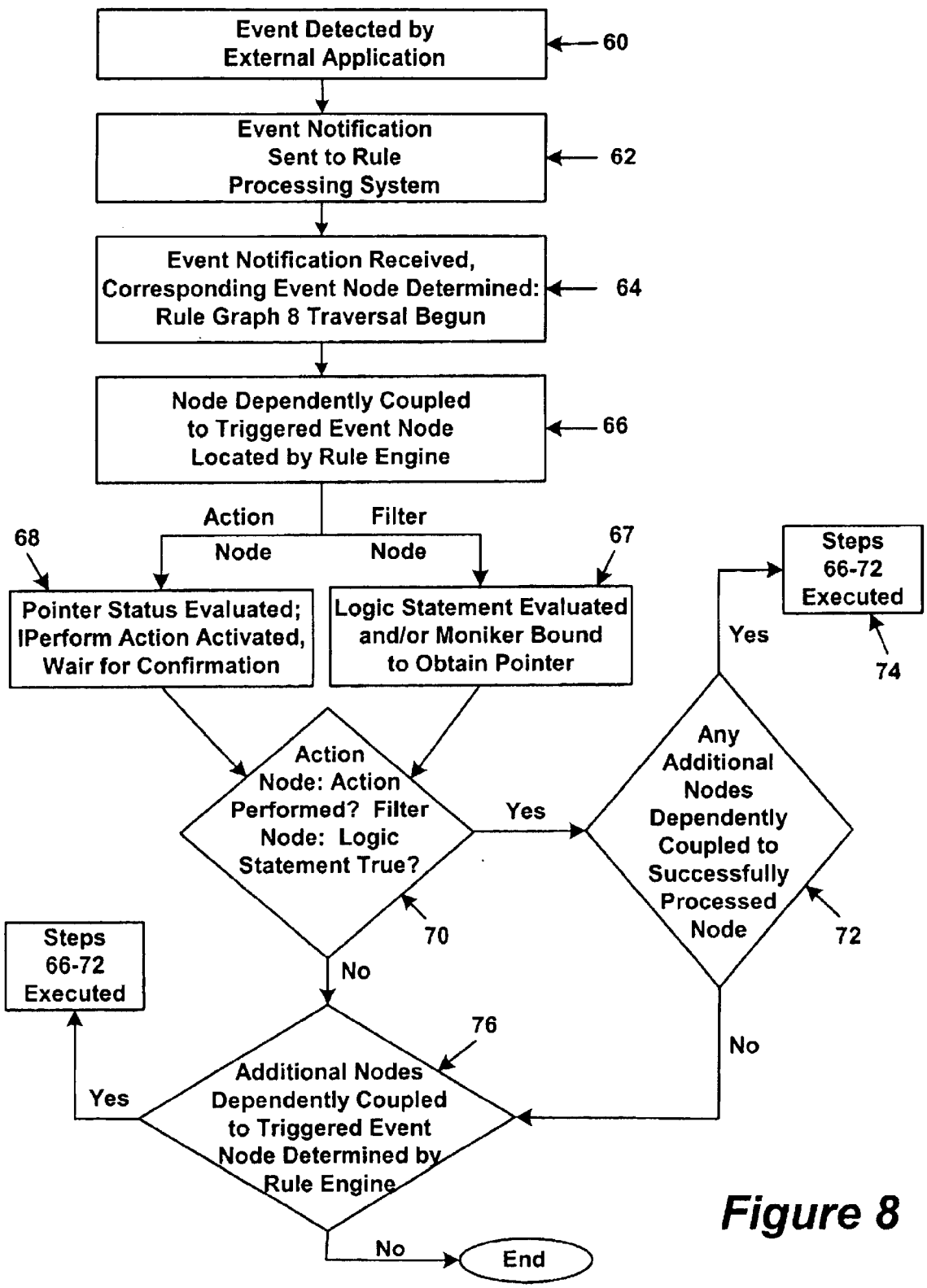
FIG. 8 shows a flow chart of an exemplary processing operation of the exemplary rule processing system, according to an embodiment of the present invention.

FIG. 8 shows a flow chart of the operation of the exemplary rule processing system 1 according to the exemplary software object interfacing arrangement described above. As an initial matter, rule engine 2 of rule processing system 1 is waiting for receipt of an event notification signal from an application 10 related to one of the event nodes 12 in rule graph 8. In step 60, an event is detected by an external application 10 (for example, a "garage remote pressed" event may be detected by the garage door system application 10c). The external application 10 sends an event notification to the rule processing system 1 indicating the occurrence of the particular event (step 62). Such an event notification would use, for example, the COM interfaces to obtain a pointer to the event node (for example, by binding a moniker) and to signal the event by calling the notification function implemented for the triggered event node defined in the rule graph 8. The rule engine 2 receives the event notification, determines the event node to which the event notification pertains, and begins traversing the rule graph 8 to determine if any rules should be fired based on the detected event (step 64).

In step 66, the first node dependently coupled to the triggered event node (step 67) is located by the rule engine 2. If this node is an action node (step 67), the rule engine 2 obtains a pointer to an object for this node by binding the moniker stored with the node using the IMoniker interface. If the object is already running, a pointer identifying the location of the interfaces for the object is provided. If the object is not running, the bind moniker operation begins an appropriate object running and produces a pointer to the interfaces for that object. Once this pointer has been obtained, in step 68 the PerformAction function of the IPerformAction interface is activated in order to cause the object to perform its actions. Once the PerformAction function has been called, the rule engine 2 waits for a confirmation in the form of a return result from the function call. The rule engine 2 may include a "timeout" feature which causes the rule engine 2 to assume that the object failed to complete its associated action if no confirmation is returned in a certain time period.

If the first node dependently coupled to the triggered event node is a filter node, the logic statement for that filter node is evaluated and/or the moniker associated with the filter node is bound to obtain a pointer to an object which will evaluate the desired logic (step 69). The evaluating object may employ event notification functionality to receive information, such as the specific event that occurred. Where a moniker is used, the rule engine waits for an indication from the evaluating object of the logic result. The timeout feature may be used in conjunction with event filter nodes as well.

In step 70, if the confirmation indicates that the object has successfully performed its associated action—or, in the case of a filter node, that its logic statement has evaluated to true—then the rule engine 2 determines if there are any nodes that are dependently coupled to the completed node (step 72). If the confirmation indicates that the object did not successfully complete its associated action (or that the logic statement of the filter node evaluated to false), then the rule engine 2 goes on to determine if there are any other nodes dependently coupled to the event node that was triggered (step 76).

If there are nodes that are dependently coupled to the successfully processed node, those nodes are then processed (step 74) according to the process steps outlined in steps 67–72 a moniker is bound, PerformAction is called, and any further nodes are processed in turn. Once all of the nodes dependently coupled to the successfully completed node have been processed, processing returns to step 76, where the rule engine 2 determines whether any other nodes are dependently coupled to the triggered event node. Through this recursive processing scheme, each level of the node hierarchy may be processed in a specific order as indicated by the node coupling implemented by the user.

In addition to the features described above, additional features may be included in the rule processing system 1. Browser 6 may include capacity to allow manual operation (or simulation) of the functionality defined in rule graph 8. For example, a user may be able to highlight a particular node in rule graph 8 and obtain status information such as associated monikers or pointers, any associated variables, or cause the execution of an action. The browser 6 may also allow the user to temporarily enable or disable various rules or individual nodes in rule graph 8.

Rule processing system 1 may also include internal variables that may be available to i users for defining event filter nodes 16. For example, a variable for the time of the day may be maintained internally so that users can create rules that are triggered based on time regardless of the event notification features of those application programs 10 coupled to the rule processing system 1. Scratch-pad memory may also be provided, such that variables may be defined within the rule processing system 1 by an application 10, and those variables may then be maintained by the application 10 throughout operation of the system.

Rule processing system 1 may also be implemented to process multiple "threads" of rules in parallel. For example, where a single event is used to trigger a number of rules (or if multiple triggering events occur in close time proximity), the rule processing system may process each rule in parallel. Furthermore, the rule processing system may process multiple nodes within a rule at a given level of the rule hierarchy in parallel. For example, referring to the example rule illustrated by FIG. 3, once event 41 has occurred, the rule processing system 1 may process actions nodes 42 and 44 and event filter node 45 in parallel. By processing rule nodes in parallel, overall processing and response time may be reduced.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A rule processing system, comprising:

a rule engine;

a rule graph operatively coupled to the rule engine and containing at least one rule;

a browser coupled to the rule graph to allow access to the at least one rule; and at least one application interface to operatively couple a respective at least one external application to the rule engine and the rule graph, wherein the operation of the at least one external application is based on said at least one rule and said at least one external application is capable of modifying said at least one rule.

2. The rule processing system of claim 1. wherein the rule graph contains a number of nodes.

3. The rule processing system of claim 2, wherein the number of nodes includes at least one of an event node, action node and event filter node.

4. The rule processing system of claim 3, wherein the at least one rule includes an event node and an action node.

5. The rule processing system of claim 2, wherein each of the number of nodes represents a function performed by the at least one external application.

6. The rule processing system of claim 5, wherein the number of functions include at least one of event detection and action performance.

7. The rule processing system of claim 2, wherein the at least one rule includes multiple nodes arranged in a hierarchy.

8. The rule processing system of claim 7, wherein the hierarchy imposes a firing sequence on the multiple nodes.

9. The rule processing system of claim 2, wherein the rule graph is a directed acyclic graph.

10. The rule processing system of claim 1, wherein the at least one application interface includes a software object interface to allow communication with the at least one external application.

11. The rule processing system of claim 10, wherein the software object interface comprises a Component Object Model interface.

12. The rule processing system of claim 10, wherein the software object interface includes a facility to define and bind a moniker related to a software object present at the at least one external application.

13. The rule processing system of claim 12, wherein the software object implements a function performed by the at least one external application.

14. The rule processing system of claim 13, wherein the software object interface includes a facility to cause the software object to perform the implemented function.

15. The rule processing system of claim 1, wherein the browser comprises a user interface to allow at least one of the creation, editing and firing of rules.

16. The rule processing system of claim 15, wherein the browser allows the creation of rules via graphical representation of nodes.

17. The rule processing system of claim 15, wherein the browser allows editing of parameters related to at least one function performed by the at least one external application.

18. The rule processing system of claim 17, wherein the browser invokes an edit function at the at least one external application to edit the parameters related to the at least one function.

19. The rule processing system of claim 17, wherein the at least one function performed by the at least one external application is represented by a node in the rule graph, and the browser allows the editing of parameters related to at least one function performed by the at least one external application by selecting the node.

20. The rule processing system of claim 1, wherein the rule graph contains home automation control rules.

21. A home automation rule processing system, comprising:
    a rule engine;
    a home automation rule graph operatively coupled to the rule engine and containing at least one home automation rule;
    a browser coupled to the rule graph to allow user access to the at least one home automation rule; and
    a number of application interfaces to operatively couple a number of external home automation applications to the rule engine and the home automation rule graph, wherein the operation of the external automation applications are based on said at least one home automation rule and the external automation applications are capable of modifying the at least one home automation rule.

22. A method for processing rules, comprising:
    receiving an event notification in a rule processing system from an external application;
    determining an event node related to the event notification; and
    traversing a rule graph containing at least one rule that includes the event node, including
        determining a first dependent node that is dependently coupled to the event node,
        processing the first dependent node including communicating with the external application, and
        allowing the external application to modify the at least one rule.

23. The method of claim 22, wherein the first dependent node is an action node representing an action performed by the external application, and processing includes instructing the external application to perform the action.

24. The method according to claim 22, wherein a second dependent node is dependently coupled to the event node, and further comprising processing the second dependent node after the first dependent node has been processed.

25. The method according to claim 22, wherein a third dependent node is dependently coupled to the first dependent node, and further comprising processing the third dependent node only if a signal is received from the external application to indicate a successful processing of the first dependent node.

26. The method according to claim 22, further comprising:
    integrating the external application into the rule processing system by defining at least one node in the rule processing system representing at least one function performed by the external application.

27. The method according to claim 26, wherein the external application defines the at least node.

28. The method according to claim 26, wherein the at least one function performed by the external application comprises at least one event detection and action performance.

29. The method according to claim 26, wherein the at least one node includes at least one of an action node, an event node, and an event filter node.

30. The method according to claim 26, wherein the at least one node includes the event node and the first dependent node.

31. The method according to claim 26, further comprising defining a moniker for the at least one node.

32. The method according to claim 31, wherein processing is performed by binding the moniker to a software object that implements the at least one function performed by the external application.

33. The method according to claim 26, further comprising:
    editing a parameter related to the at least one function performed by the external application.

34. The method according to claim 33, wherein editing includes invoking an editing function at the external application.

35. The method according to claim 33, wherein editing includes using editing capabilities of a browser.

36. A storage medium, comprising:
    a set of instructions which, when executed by a processor, perform a method for processing rules, the method comprising:
    receiving an event notification in a rule processing system from an external application;
    determining an event node related to the event notification; and traversing a rule graph containing at least one rule that includes the event node, including determining a first dependent node that is dependently coupled to the event node, processing the first dependent node including communicating with the external application, and allowing the external application to modify the at least one rule.

37. The storage medium of claim 36, wherein the method further comprises:

integrating the external application into the rule processing system by defining at least one node in the rule processing system representing at least one function performed by the external application.

38. The storage medium of claim 37, wherein the method further comprises:

editing a parameter related to the at least one function performed by the external application.

39. The storage medium of claim 38, wherein editing includes invoking an editing function at the external application.

40. The storage medium of claim 38, wherein editing includes using editing capabilities of a browser.

* * * * *

UNITED STATES PATENT AND TRADEMARK OFFICE
CERTIFICATE OF CORRECTION

PATENT NO.       : 6,876,889 B1                                   Page 1 of 1
APPLICATION NO.  : 09/195362
DATED            : April 5, 2005
INVENTOR(S)      : Victor B. Lortz et al.

It is certified that error appears in the above-identified patent and that said Letters Patent is hereby corrected as shown below:

Column 13, Line 7  "functions include"
       should be  - -functions includes- -

Column 14, Line 35 "the at least node"
       should be  - -the at least one node- -

Signed and Sealed this

Twenty-ninth Day of August, 2006

JON W. DUDAS
*Director of the United States Patent and Trademark Office*